US007336901B1

(12) United States Patent
Soulliere

(10) Patent No.: US 7,336,901 B1
(45) Date of Patent: Feb. 26, 2008

(54) RECONFIGURABLE OPTICAL ADD-DROP MULTIPLEXERS EMPLOYING OPTICAL MULTIPLEX SECTION SHARED PROTECTION

(75) Inventor: Mark J. Soulliere, Corning, NY (US)

(73) Assignee: Avanex Corporation, Fremont, CA (US)

( * ) Notice: Subject to any disclaimer, the term of this patent is extended or adjusted under 35 U.S.C. 154(b) by 644 days.

(21) Appl. No.: 10/786,175

(22) Filed: Feb. 24, 2004

(51) Int. Cl.
*H04J 14/02* (2006.01)
(52) U.S. Cl. .......................... 398/94; 398/24; 398/30; 398/83; 398/93; 398/94
(58) Field of Classification Search ............ 398/45–50, 398/56, 59, 2–5, 24, 30
See application file for complete search history.

(56) References Cited

U.S. PATENT DOCUMENTS

| 6,414,765 | B1 | 7/2002 | Li et al. | |
|---|---|---|---|---|
| 6,434,288 | B1* | 8/2002 | Uemura et al. | 385/16 |
| 7,116,905 | B2* | 10/2006 | Kinoshita et al. | 398/59 |

OTHER PUBLICATIONS

M.J. Li et al, "Transparent two-fiber optical channel shared protection ring," Proc. of NFOEC 2001, pp. 419-430, Baltimore MD, 2001.

Mark J. Soulliere, Corning Incorporated, "Transparent Optical Channel shared protection ring," ANSI T1×1.5 standards contribution T1×1.5/2001-027, Jan. 2001.

M.J. Li et al, "Two-fiber optical channel shared protection ring with 4×4 thermal-optic switches," Proc. of OFC 2001, paper Tu07-1.

Ming-Jun Li, Corning Incorporated, "Feasibility study of transparent optical channel shared protection ring, " ANSI T1×1.5 standards contribution T1×1.5/2001-176, Sep. 2001.

I. Tomkos et al, "Transparent ultra-long-haul optical networks enabled by broadcast and select OADMs," Proc. of SPIE, vol. 4907, pp. 93-99, Oct. 2002.

* cited by examiner

*Primary Examiner*—Jason Chan
*Assistant Examiner*—Wai Lun Leung
(74) *Attorney, Agent, or Firm*—Patterson & Sheridan, LLP

(57) ABSTRACT

A reconfigurable optical add-drop multiplexer is disclosed that enables Optical Multiplex Section (OMS) shared protection rings. The ROADM comprises a first optical supervisory module, coupled to a first amplifier module, which in turn is coupled to a first broadcast and select module, where the first broadcast and select module is coupled to both a first multiplexer/demultiplexer module and the first optical supervisory module. Each optical supervisory module has an optical tap for tapping a fraction of an outgoing OMS signal that is fed back or looped back to a 2×1 optical switch in the optical supervisory module.

13 Claims, 15 Drawing Sheets

RECONFIGURABLE OPTICAL ADD-DROP MULTIPLEXERS EMPLOYING OPTICAL MULTIPLEX SECTION SHARED PROTECTION

BACKGROUND INFORMATION

1. Field of the Invention

The invention relates generally to the field of optics and more particularly to optical add-drop multiplexers.

2. Description of Related Art

Transparent optical shared protection rings enhance wavelength division multiplexing (DWDM) networks. One conventional architecture is a two-fiber Optical Channel (OCh) shared protection ring which is a type of network protection that resembles many of the features present in current SONET bidirectional line switched rings, or SDH shared protection rings. Several OCh shared protection rings employ switching at the "end-nodes" where individual Optical Channels are added and dropped from the ring. This style of ring switching is termed "end-node" switching, as described with respect to FIGS. 1A and 1B.

Under normal conditions as depicted in FIG. 1A, an outgoing primary traffic 130 (traffic to be protected) is added at a node B 150, transported clockwise within a DWDM signal, and dropped at a node D 170 on a channel labeled $\lambda 1$ 110. The return traffic is added at the node D 170, transported counter-clockwise within a DWDM signal, and dropped at the node B 150 on a channel labeled $\lambda 2$ 120. A bidirectional primary traffic 140 is on different wavelengths in order for the protection mechanism to work without optical-to-electrical-to-optical (OEO) conversion. The labels "$\lambda 1$" 110 and "$\lambda 2$" 120 are generically meant to convey different wavelengths. A self-healing ring that avoids costly OEO transitions is termed optically transparent.

Under failure conditions (e.g. cable cut between the nodes B 150 and C 160) as shown in FIG. 1B, the end-nodes B 150 and D 170 bridge (make an optical copy of) their add signals and send them in both directions around the ring. End-nodes B 150 and D 170 then switch (select) their drop signals based on the best signal that arrives. This implementation is termed OCh shared protection with end-node switching. It resembles many of the features present in transoceanic SDH shared protection rings. A failure such as fiber cut may affect several Optical Channels (wavelengths) at same time. Nevertheless, failure detection, triggering, and ring switching are all completed separately for each Optical Channel. This allows a ring node to employ protection switching on some Optical Channels, and not on others.

To operate correctly, the nodes on the ring exchange automatic protection switching (APS) messages among themselves. One way to exchange messages is to place them within an Optical Supervisory Channel (OSC) signal. Typically, OSC signals are transmitted between adjacent nodes, and are separate in wavelength from the DWDM signals.

Another approach employing a transparent OCh shared protection is shown in FIGS. 2A and 2B. The primary traffic 130 is again on different wavelengths, as in FIGS. 1A and 1B. When a failure such as a cable cut 210 occurs, the two nodes adjacent to the failure bridge (copy) the working signals heading toward the failed span. The bridged copy is "looped back" to travel on protection capacity in the other direction around the ring. At the same time, the looped back signal arriving on protection capacity from the other adjacent node is looped back as a working signal. End-nodes continue to add and drop their signals to and from working capacity. This implementation is termed OCh shared protection with loopback switching. It resembles many of the features present in current conventional SONET bidirectional line switched rings, or terrestrial SDH shared protection rings.

OCh shared protection using end-node switching has a network advantage over protection using loopback switching. Transparent rings are engineered to support the longest possible optical path. For a ring of N nodes, the longest path for a working channel is N–1 spans. The longest path for a protected channel depends on the chosen switching mechanism. FIGS. 3A and 3B illustrate an eight node ring.

Under normal conditions, a working channel is added at node 1 (310), travels clockwise through seven spans, and is dropped at node 8 (380). Consider a situation where a cable is cut between nodes 7 (370) and 8 (380). When loopback switching is employed, the protected channel travels 13 spans, as shown in FIG. 3A. When end-node switching is employed, the protected channel travels 1 span, as shown in FIG. 3B.

For an OCh shared protection ring with N nodes, the worst case (protection) channel may travel through 2N–3 spans using loopback switching, or N–1 spans using end-node switching. Given equivalent node performances, a transparent ring employing loopback switching will be constrained to roughly half the size of a ring employing end-node switching.

Accordingly, there is a need to design a reconfigurable optical add-drop multiplexer that reduces node complexity with less optical devices in shared protection rings.

SUMMARY OF THE INVENTION

A simpler protection mechanism than OCh shared protection exists to protect against the most common failures such as fiber breaks, line amplifier failures, and intermediate OADM failures. These types of failures interrupt the entire DWDM signal, defined as an Optical Multiplex Section (OMS). The present invention discloses a reconfigurable optical add-drop multiplexer (ROADM) that enables Optical Multiplex Section shared protection rings. The ROADM comprises a first optical supervisory module, coupled to a first amplifier module, which in turn is coupled to a first broadcast and select module, where the first broadcast and select module is coupled to both a first multiplexer/demultiplexer module and the first optical supervisory module. The ROADM further comprises a second optical supervisory module, coupled to a second amplifier module, which in turn is coupled to a second broadcast and select module, where the second broadcast and select module is coupled to both a second multiplexer/demultiplexer module and the second optical supervisory module. Each optical supervisory module has an optical tap for tapping a fraction of an outgoing OMS signal that is fed back or looped back to a 2×1 optical switch in the optical supervisory module. Optionally, each amplifier module can be divided into a preamplifier and a booster amplifier that are coupled between a broadcast and select module for better matching of a span length.

Advantageously, the ROADMs in the present invention reduce node complexity with a few optical devices while providing superior node performance for a smaller overall ring size relative to previous designs. In addition, the optical loss of signals passing through a ROADM is lower than alternate designs employing layers of small switch fabrics or redundant large switch fabrics. The savings in node losses may instead be used for longer spans, which provides a performance advantage. Alternatively, the savings in node losses may permit less powerful EDFAs, leading to cost savings. The ROADM designs of the present invention that support OMS shared protection with loopback switching advantageously result in lower costs, less space, and simpler signaling routing.

Other structures and methods are disclosed in the detailed description below. This summary does not purport to define the invention. The invention is defined by the claims.

DETAILED DESCRIPTION OF PREFERRED EMBODIMENTS

An OCh shared protection ring with loopback switching would detect failures, trigger and complete switching on a per-channel basis. This typically requires optical (or electrical) bridges and switches for each individual Optical Channel. A simpler protection mechanism exists to protect against failures such as fiber breaks, line amplifier failures, and intermediate OADM failures. These types of failures interrupt the entire DWDM signal, defined as an Optical Multiplex Section signal in ITU (International Telecommunication Union) standards.

Figure 4:
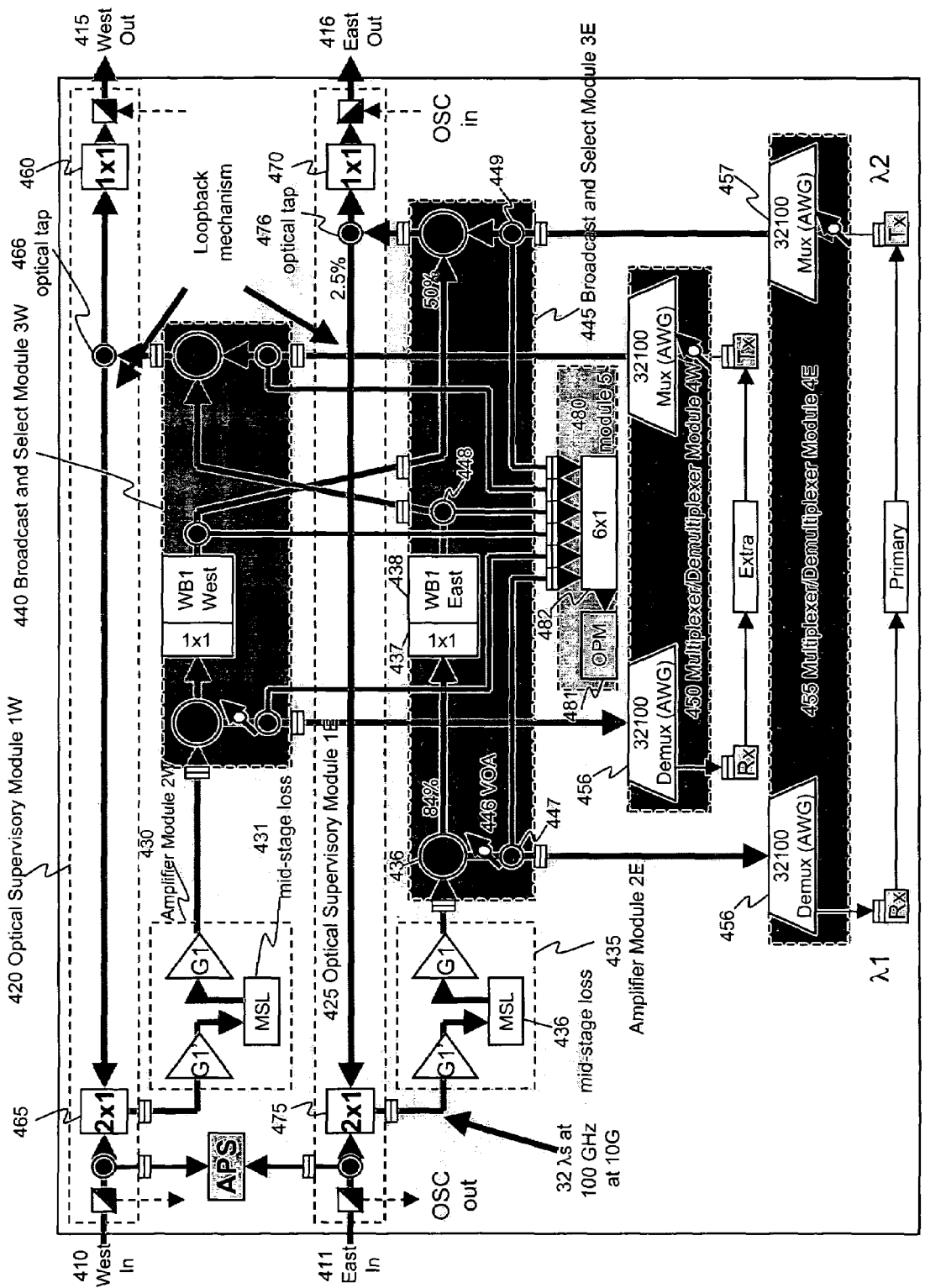
FIG. 4 depicts an architectural diagram illustrating a first embodiment of reconfigurable optical add-drop multiplexer that supports Optical Multiplex Section shared protection with loopback switching in accordance with the present invention.

FIG. 4 depicts an architectural diagram illustrating a first embodiment of reconfigurable optical add-drop multiplexer 400 that supports Optical Multiplex Section shared protection with loopback switching in accordance with the present invention. The ROADM 400 employs an OMS shared protection mechanism within an optical supervisory module 1W 420 and an optical supervisory module 1E 425. A small fraction of the outgoing OMS signal is fed back via a 2.5% optical tap 466 to a 2×1 optical switch 465 in the optical supervisory module 1W 420, or by a 2.5% optical tap 476 to a 2×1 optical switch 475 in the optical supervisory module 1E 425. The 2×1 switch 465 or 475 can choose its incoming OMS signal to be that from the incoming fiber, or the "loopback" copy of an outgoing OMS signal. In this case, all Optical Channels are looped back away from the downstream failure, hence the name OMS shared protection with loopback switching.

The reconfigurable optical add-drop multiplexer 400 supports an OMS shared protection ring with up to 32 channels, with each channel supporting a signal with a bit rate up to around 10 Gb/s. Multichannel signals arrive on either a "west" incoming fiber 410 or "east" incoming fiber 411, and depart on either a west outgoing fiber 415 or east outgoing fiber 416. Any of the 64 incoming channels can be remotely configured to drop locally within the ROADM 400, or pass through. The optical functions within the node have been arranged to generally be within five separate sets of modules. These groupings have been chosen such that failure and replacement of any one of these modules does not cause a simultaneous failure of both an add or drop signal from the east side with an add or drop signal from the west side. Optical connectors are shown between modules to indicate that the modules can be removed, and to account for internal node losses.

A multichannel signal arriving on the east incoming fiber 411 first enters an optical supervisory module 1E 425, where the optical supervisory channel is stripped out and terminated. Incoming APS messages could arrive via the OSC. The remaining DWDM signals are tapped at the optical tap 476, with a portion of their light used to determine the presence, absence (and possibly quality) of incoming channels. Absence of incoming channels is a typical trigger for protection switching. Absence of all incoming power may be attributed to an upstream fiber break. If automatic power reduction procedures are employed, then the entire DWDM signal on the east outgoing fiber 416 is turned off or blocked upon discovery of no signal on the east incoming fiber 411. This is achieved by the opening of the 1×1 switch 470 on the outgoing signal in the optical supervisory module 1E 425.

The incoming DWDM signal passes through a two-stage EDFA in an amplifier module 2E 435, which is presumed to support extra optical loss between the stages. This mid-stage loss may be allocated towards such items as a dispersion compensating fiber module, if required within the system design. The incoming DWDM signal then passes into the broadcast and select module 2E 445. The DWDM signal is broadcasted (split) at an optical splitter 436, with one copy used for drop signals and the other for through signals. The dropped DWDM signal is attenuated as needed by a variable optical attenuator (VOA) 446, then presented to a demultiplexer 456 within a mutiplexer/demultiplexer module 4E 455. The demultiplexer 456 is presumed in this example to be a 32 channel arrayed waveguide grating (AWG) device, with channel spacings of 100 GHz. Meanwhile, the through DWDM signal is presented first to a 1×1 switch 437, then a wavelength blocker WB1 East 438. The wavelength blocker WB1 East 438 has the "select" functionality of taking in a multichannel signal, demultiplexing the channels, attenuating or blocking each channel independently, and remultiplexing the channels. The Avanex PowerBlocker™ Dynamic Wavelength Blocker is an example of a wavelength blocker. Channels meant to be dropped locally are blocked by the wavelength blocker 438 from being part of the through signal. Channels meant to pass through the node may be power equalized by the wavelength blocker 438, thereby removing any imbalances introduced by the EDFA module. If the wavelength blocker 438 is transmissive under failure conditions, then channels will not be blocked. The 1×1 switch 470 is set to the open (blocking) position during wavelength blocker failures in order to avoid channel interference with add signals. The combined 1×1 switch and wavelength blocker "fail to black." The reconstituted DWDM through signal is then presented to be combined with the add DWDM signal within the broadcast and select module 3W 440.

Individual add signals pass through individual VOAs prior to a multiplexing AWG 457 within the multiplexer/demultiplexer module 4E 455. The add DWDM signal is then combined with the through DWDM signal in the broadcast and select module 3W 440. The VOAs help match the add channel powers to the through channel powers. The combined outgoing DWDM signal then passes through the 1×1 switch 470 (used for automatic power reduction) and is combined with a new outgoing OSC signal. Outgoing APS messages could leave via the OSC.

Finally, optical taps 447, 448, and 449 are placed, respectively, on the drop, through, and add DWDM signals within the node. The tapped DWDM signals are routed to a centralized optical performance monitoring (OPM) function 481 within a module 5 (480). In this implementation, a 6×1 switch 482 is set to choose what DWDM signal to monitor. The OPM functionality may include an amplifier for the chosen DWDM signal followed by an optical spectrum analyzer, or perhaps a tunable filter and receiver. It is also possible to use the tapped drop DWDM signals for triggering protection switching. This would then cover the possibility of failures of the EDFAs found in modules 2W 430 and 2E 435. If this implementation is followed, then the OPM functionality would need to be upgraded accordingly (e.g. by sending the incoming tapped signals to separate power monitors).

Table 1 below demonstrates the practical feasibility of the reconfigurable OADM 400 by illustrating the loss budgets of individual through, add, and drop signals in a reconfigurable OADM supporting OMS shared protection with loopback switching

| Maximum no. channels 32 | Device Gain/ Loss (dB) | Through Channel (dBm) | Add Channel (dBm) | Drop Channel (dBm) | Comments |
|---|---|---|---|---|---|
| Transmitter output power | | | −1 | | |
| Connector | −0.25 | | −1.3 | | |
| Variable optical attenuator | −1 | | −2.3 | | At minimum setting |
| 32100 AWG multiplexer | −4 | | −6.3 | | |
| Connector | −0.25 | | −6.5 | | |
| OPM tap (add signal) | −0.1 | | −6.6 | | 98% Modeled as 1.1 * 10 * log 10(%) |
| Coupler (add signal) | −3.3 | | −9.9 | | 50% Modeled as 1.1 * 10 * log 10(%) |
| Incoming channel power | | −27.2 | | −27.2 | |
| OSC drop filter | −0.5 | −27.7 | | −27.7 | |
| APS tap | −0.1 | −27.8 | | −27.8 | 98% Modeled as 1.1 * 10 * log (%) |
| 2 × 1 switch | −1 | −28.8 | | −28.8 | |
| Connector | −0.25 | −29.0 | | −29.0 | |
| EDFA1 preamp G1' | 24.6 | −3.1 | | −3.1 | −29 dBm min input power |
| | | | | | 12 dBm max output power |
| | | | | | 12 dB max midstage loss after preamp |
| EDFA1 available midstage loss | −12 | −15.1 | | −15.1 | |
| EDFA1 booster amp G1 | 17.0 | 1.9 | | 1.9 | 17 dBm max output power |
| Connector | −0.25 | 1.7 | | 1.7 | |
| Splitter (through signal) | −0.8 | 0.9 | | | 84% Modeled as 1.1 * 10 * log (%) |
| 1 × 1 switch | −1 | −0.1 | | | |
| Wavelength blocker 1 | −6 | −6.1 | | | |
| OPM tap (through signal) | −0.1 | −6.2 | | | 98% Modeled as 1.1 * 10 * log (%) |
| Connector | −0.25 | −6.5 | | | |
| Coupler (through signal) | −3.3 | −9.8 | | | 50% Modeled as 1.1 * 10 * log (%) |
| Connector | −0.25 | −10.0 | −10.2 | | |
| Splitter (outgoing signal) | −0.1 | −10.2 | −10.3 | | 97.5% Modeled as 1.1 * 10 * log (%) |
| 1 × 1 switch | −1 | −11.2 | −11.3 | | |

-continued

| Maximum no. channels 32 | Device Gain/ Loss (dB) | Through Channel (dBm) | Add Channel (dBm) | Drop Channel (dBm) | Comments |
|---|---|---|---|---|---|
| OSC add filter | −0.5 | −11.7 | −11.8 | | |
| Outgoing channel power | | −11.7 | −11.8 | | |
| Splitter (loopback signal) | −17.6 | −27.7 | −27.8 | | 2.5% Modeled as 1.1 * 10 * log (%) |
| Splitter (drop signal) | −8.8 | | | −7.1 | 16% Modeled as 1.1 * 10 * log (%) |
| Variable optical attenuator | −1 | | | −8.1 | At minimum setting |
| OPM tap (drop signal) | −0.1 | | | −8.2 | 98% Modeled as 1.1 * 10 * log * 10(%) |
| Connector | −0.25 | | | −8.4 | |
| 32100 AWG demultiplexer | −4 | | | −12.4 | |
| Connector | −0.25 | | | −12.7 | |
| Channel power at receiver | | | | −12.7 | |
| Maximum span loss (dB) | | 15.5 | 15.4 | | Incoming - outgoing channel power |
| Maximum node loss (dB) | | 27.5 | 10.8 | 28.4 | Includes EDFA1 midstage loss |

Values in yellow are assumptions
All other values are calculated

For a given mixture of optical loss and gain elements, the degradation of a channel's optical signal-to-noise ratio (OSNR) can be minimized by a prudent "spreading out" of the gain elements among the loss elements. Variable gain amplifiers enjoy such an OSNR advantage compared to fixed gain amplifiers for this reason. The optical gain within the ROADM of FIG. 4 is concentrated in one location.

Figure 5:
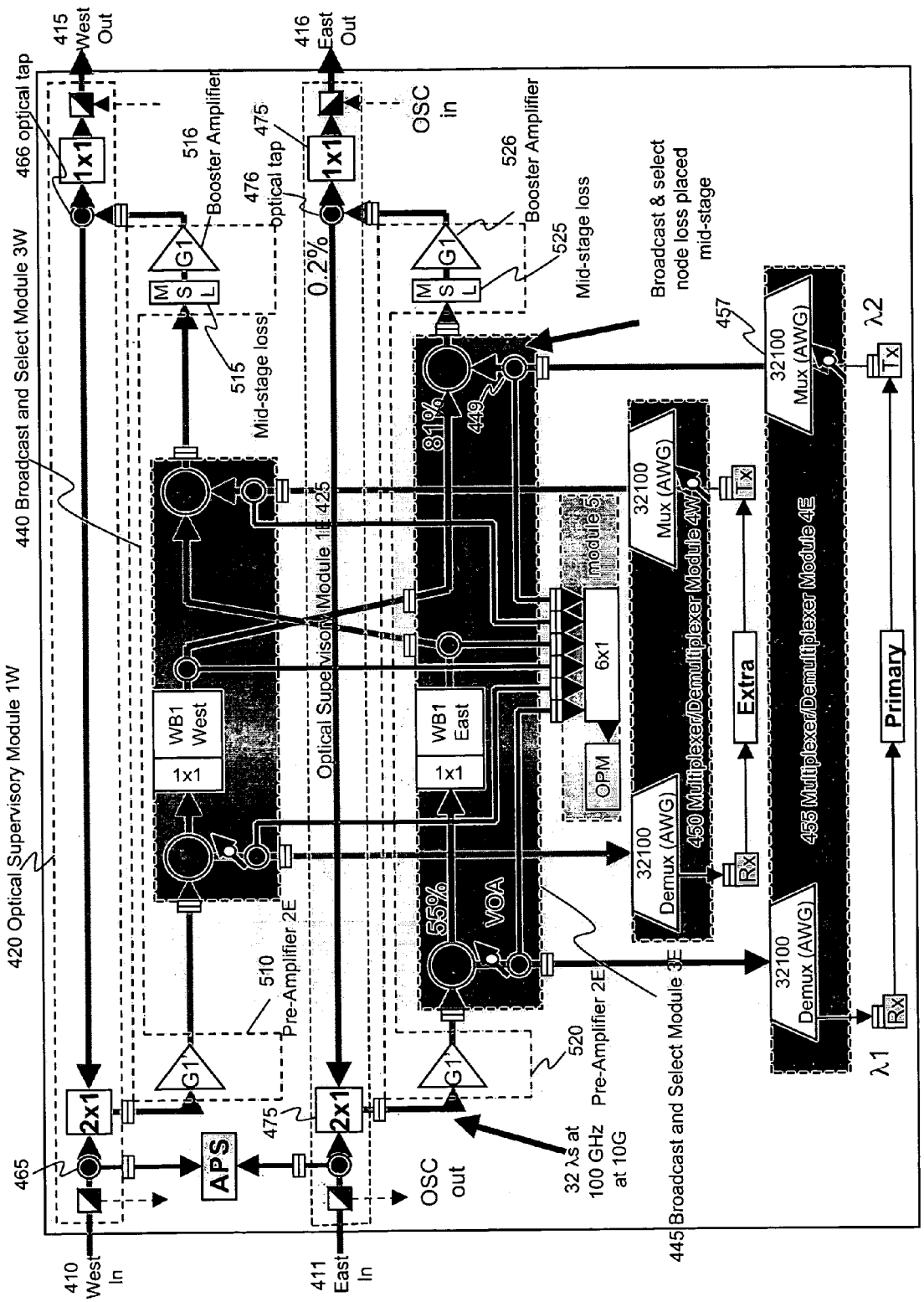
FIG. 5 depicts an architectural diagram illustrating a second embodiment of reconfigurable optical add-drop multiplexer that supports Optical Multiplex Section shared protection with loopback switching which spreads the gain of the pre-amplifier and booster amplifier in accordance with the present invention.

FIG. 5 depicts an architectural diagram illustrating a second embodiment of reconfigurable optical add-drop multiplexer 500 that supports Optical Multiplex Section shared protection with loopback switching which spreads the gain of the pre-amplifier and booster amplifier in accordance with the present invention. The ROADM 500 operates with similar functionalities as the ROADM 400 in FIG. 4, except that the booster amplifier and residual mid-stage loss of modules 2E 430 and 2W 435 are moved from before the drop splitter to after the add coupler. Placing all the broadcast and select loss as part of the mid-stage loss of the amplifier modules is expected to result in the following benefits:

Better OSNR performance.

Flexibility to easily choose a booster amplifier with higher output power. If different booster amplifier (G1) output power options were used within the FIG. 4 design, then the drop splitter and add coupler ratios would need to be adjusted for each option. With the FIG. 5 mid-stage add-drop designs 515 and 525, no such adjustments are necessary. Booster amplifier output powers 516 and 526 could be more closely matched to span losses, offering an opportunity for cost savings in the network.

An opportunity to convert loss reserved for dispersion compensation modules into span loss instead. In the FIG. 4 design, the mid-stage loss 431 (and 436) (on the order of 12 dB) is reserved for use within the node regardless of whether dispersion compensating fiber modules are needed or not. If a ring were operating with all 2.5 Gb/s signals rather than 10 Gb/s signals, then many instances of the "reserved" loss for dispersion compensating fiber modules would likely not be necessary. With the FIG. 5 design, dispersion compensating fiber module loss appears external to the node, i.e. as part of the span loss. When dispersion compensating fiber modules are necessary, they may be placed by the multichannel inputs or outputs of the ROADM. When dispersion compensating fiber modules are not necessary, the loss savings can instead be used towards longer spans. If line amplifiers are used within rings, this presents another engineering option. "Extra" dispersion compensation may be placed mid-stage within the line amplifiers to allow less dispersion compensating fiber module loss at the ROADM sites. The loss savings could then be used towards longer spans.

Table 2 demonstrates the practical feasibility of the FIG. 5 mid-stage add-drop design in the reconfigurable OADM 500 by illustrating the loss budgets of individual through, add, and drop signals, supporting OMS shared protection with loopback switching.

| Maximum no. channels 32 | Device Gain/ Loss (dB) | Through Channel (dBm) | Add Channel (dBm) | Drop Channel (dBm) | Comments |
|---|---|---|---|---|---|
| Transmitter output power | | | −1 | | |
| Connector | −0.25 | | −1.3 | | |
| Variable optical attenuator | −1 | | −2.3 | | At minimum setting |
| 32100 AWG multiplexer | −4 | | −6.3 | | |
| Connector | −0.25 | | −6.5 | | |
| OPM tap (add signal) | −0.1 | | −6.6 | | 98% Modeled as 1.1 * 10 * log 10(%) |
| Coupler (add signal) | −7.9 | | −14.5 | | 19% Modeled as 1.1 * 10 * log 10(%) |
| Incoming channel power | | −27.2 | | −27.2 | |
| OSC drop filter | −0.5 | −27.7 | | −27.7 | |
| Connector | −0.25 | −27.9 | | −27.9 | |
| APS tap | −0.1 | −28.0 | | −28.0 | 98% Modeled as 1.1 * 10 * log (%) |
| 2 × 1 switch | −1 | −29.0 | | −29.0 | |

-continued

| Maximum no. channels 32 | Device Gain/ Loss (dB) | Through Channel (dBm) | Add Channel (dBm) | Drop Channel (dBm) | Comments |
|---|---|---|---|---|---|
| EDFA1 preamp G1' | 24.6 | −3.1 | | −3.1 | −29 dBm min input power |
| | | | | | 12 dBm max output power |
| | | | | | 12 dB max midstage loss after preamp |
| Connector | −0.25 | −3.3 | | −3.3 | |
| Splitter (through signal) | −2.9 | −6.2 | | | 55% Modeled as 1.1 * 10 * log (%) |
| 1 × 1 switch | −1 | −7.2 | | | |
| Wavelength blocker 1 | −6 | −13.2 | | | |
| OPM tap (through signal) | −0.1 | −13.3 | | | 98% Modeled as 1.1 * 10 * log (%) |
| Connector | −0.25 | −13.5 | | | |
| Coupler (through signal) | −1.0 | −14.5 | | | 81% Modeled as 1.1 * 10 * log (%) |
| Connector | −0.25 | −14.8 | −14.8 | | |
| EDFA1 available midstage loss | −0.3 | −15.1 | −15.1 | | |
| EDFA1 booster amp G1 | 17.0 | 1.9 | 1.9 | | 17 dBm max output power |
| Splitter (outgoing signal) | 0.0 | 1.9 | 1.9 | | 99.8% Modeled as 1.1 * 10 * log (%) |
| 1 × 1 switch | −1 | 0.9 | 0.9 | | |
| OSC add filter | −0.5 | 0.4 | 0.4 | | |
| Outgoing channel power | | 0.4 | 0.4 | | |
| Splitter (loopback signal) | −29.7 | −27.7 | −27.8 | | 0.2% Modeled as 1.1 * 10 * log (%) |
| Splitter (drop signal) | −3.8 | | | −7.1 | 45% Modeled as 1.1 * 10 * log (%) |
| Variable optical attenuator | −1.0 | | | −8.1 | At minimum setting |
| OPM tap (drop signal) | −0.1 | | | −8.2 | 98% Modeled as 1.1 * 10 * log * 10(%) |
| Connector | −0.25 | | | −8.5 | |
| 32100 AWG demultiplexer | −4 | | | −12.5 | |
| Connector | −0.25 | | | −12.7 | |
| Channel power at receiver | | | | −12.7 | |
| Maximum span loss (dB) | | 27.6 | 27.6 | | Incoming - outgoing channel power |
| Maximum node loss (dB) | | 13.5 | 15.6 | 11.5 | Includes EDFA1 midstage loss |

Values in yellow are assumptions
All other values are calculated

In particular, Table 3 shows the product specification for wavelength blocker loss and amplifier power and mid-stage loss figures are as follows: the worst case transmitter output powers of −1 dBm is used in all cases, and the worst case power presented to receivers is −12.7 to −12.8 dBm. With the choice of coupling and split ratios chosen for the FIG. 5 mid-stage add-drop design, all but 0.3 B of the available 12 dB of mid-stage loss is used up.

Table 3 compares the loss and power attributes of the ROADM design 400 as shown in FIG. 4 and the ROADM design 500 in FIG. 5.

| | | FIG. 4 (Loopback) | FIG. 5 (Loopback, mid-stage) | Comments |
|---|---|---|---|---|
| Span loss for throughs | (dB) | 15.5 | 27.6 | |
| Span loss for adds | (dB) | 15.4 | 27.6 | |
| Span distance at 0.275 dB/km | (km) | 56 | 100 | |
| Span dispersion at 17 ps/nm km | (ps/nm) | 950 | 1705 | |
| Node loss for throughs | (dB) | 27.5 | 13.5 | |
| Through loss available for DC | (dB) | 12.0 | 0.3 | |
| Power at Tx for adds | (dBm) | −1.0 | −1.0 | Same Tx |
| Node loss for adds | (dB) | 10.8 | 15.6 | |
| Add loss available for DC | (dB) | 0 | 0.3 | |
| Power at Rx for drops | (dBm) | −12.7 | −12.7 | Same Rx |
| Node loss for drops | (dB) | 28.4 | 11.5 | |
| Drop loss available for DC | (dB) | 12.0 | 0 | |

The ROADM 400 in FIG. 4 and the ROADM 500 in FIG. 5 (supporting OMS shared protection with loopback switching) have the following advantages over a ROADM that supports OCh shared protection with end-node switching:

Savings in parts cost, and in equipment space. Two splitters and two 2×1 optical switches are required, versus up to 32 splitters, 32 1×2 optical switches and 64 2×1 optical switches used on the add/drop legs of a ROADM supporting OCh shared protection.

Longer allowable spans. The FIG. 5 mid-stage add-drop ROADM design enables span lengths up to 100 km. This compares favorably to the maximum span length of 56 km for the FIG. 4 design, which is also the expected span length for an equivalently powered ROADM supporting OCh shared protection.

Lower losses through each node (should translate to better OSNR performance across the node).

Simpler automatic protection switch signaling protocol and message structure.

As mentioned above, the mid-stage add-drop feature of FIG. 5 has advantages over lumped gain aspect of FIG. 4 in terms of design flexibility and increased span length.

Figure 1B:
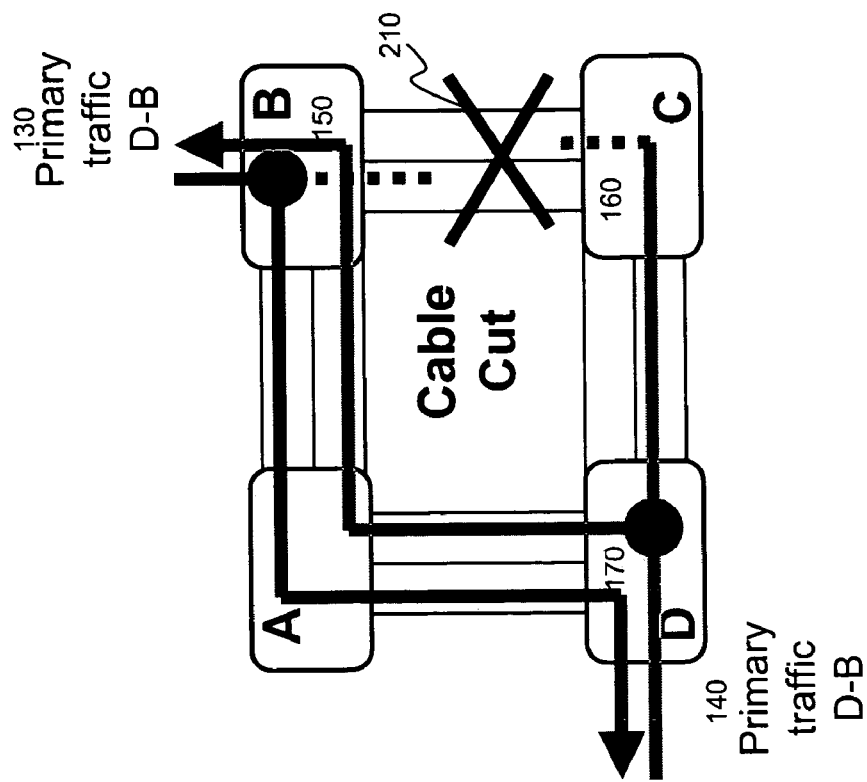
FIG. 1B depicts a conventional architectural diagram illustrating Optical Channel shared protection with end-note switching when a cable is cut.
Figure 1A:
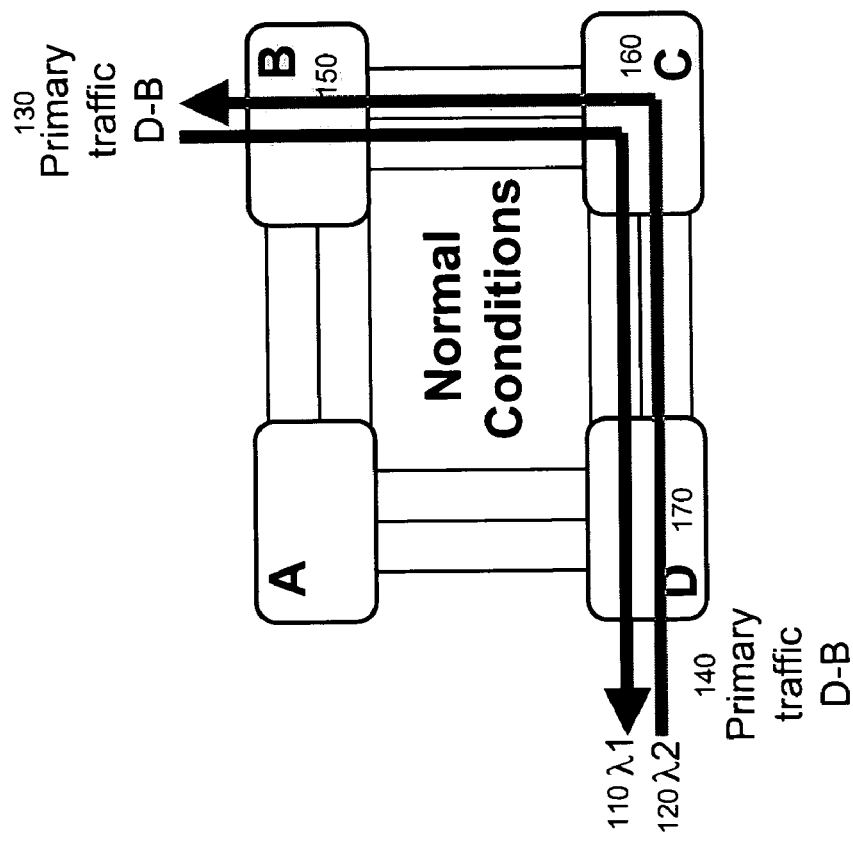
FIG. 1A depicts a conventional architectural diagram illustrating Optical Channel shared protection with end-note switching under normal conditions.
Figures 2A, 2B:
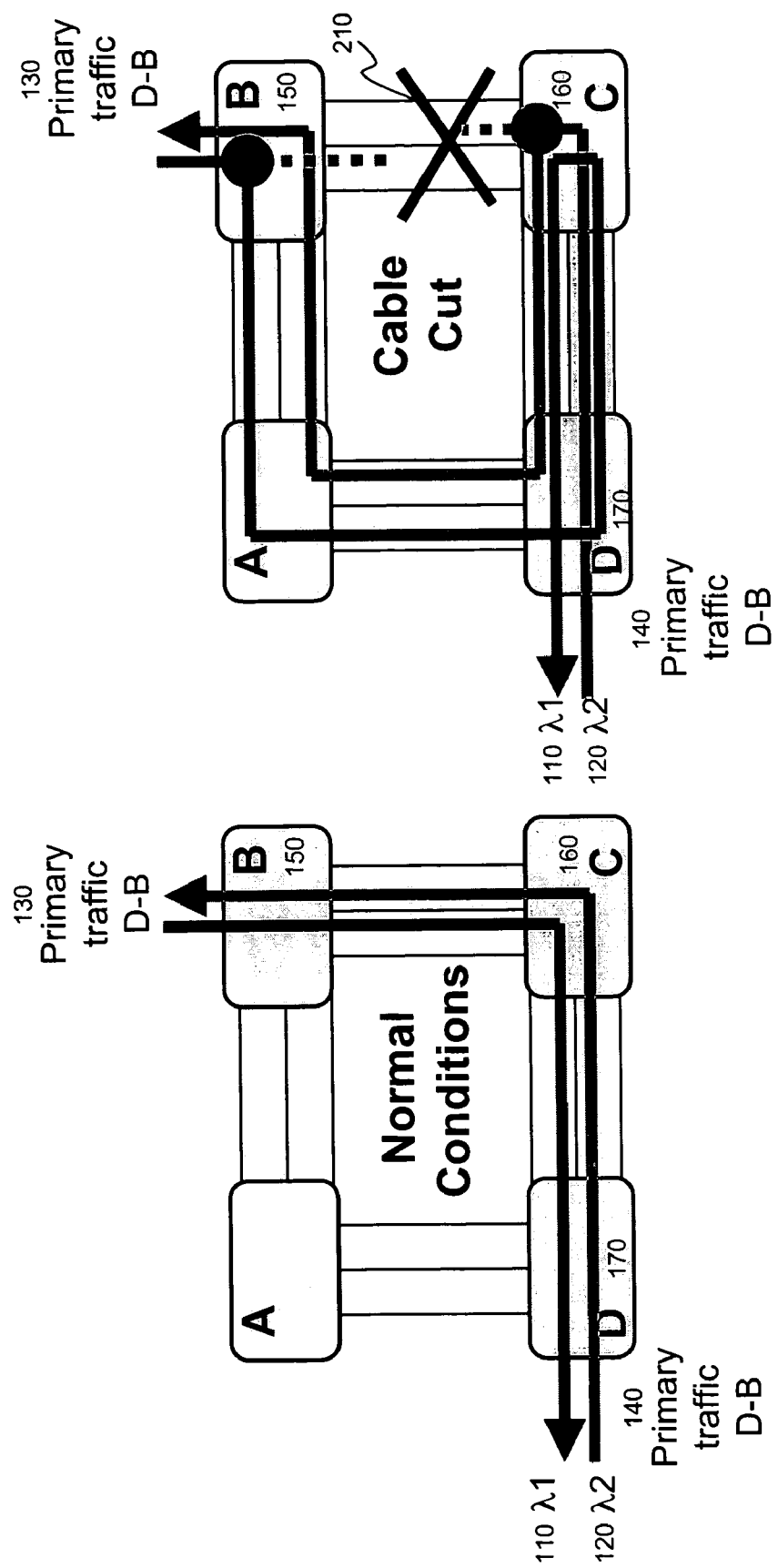
FIG. 2A depicts a conventional architectural diagram illustrating Optical Channel shared protection with loopback switching under normal conditions.
FIG. 2B depicts a conventional architectural diagram illustrating Optical Channel shared protection with loopback switching when a cable is cut.
Figure 3B:
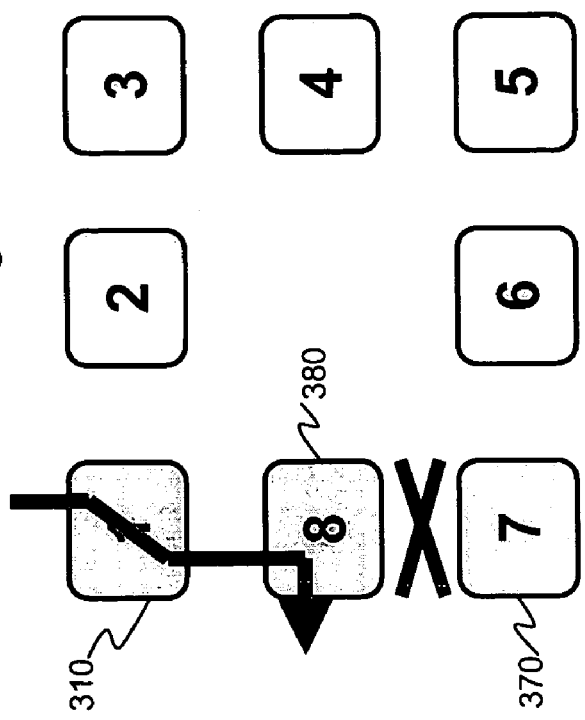
FIG. 3B depicts a conventional architectural diagram illustrating an eight node ring that shows the longest path for protected channel using end-note switching.
Figure 3A:
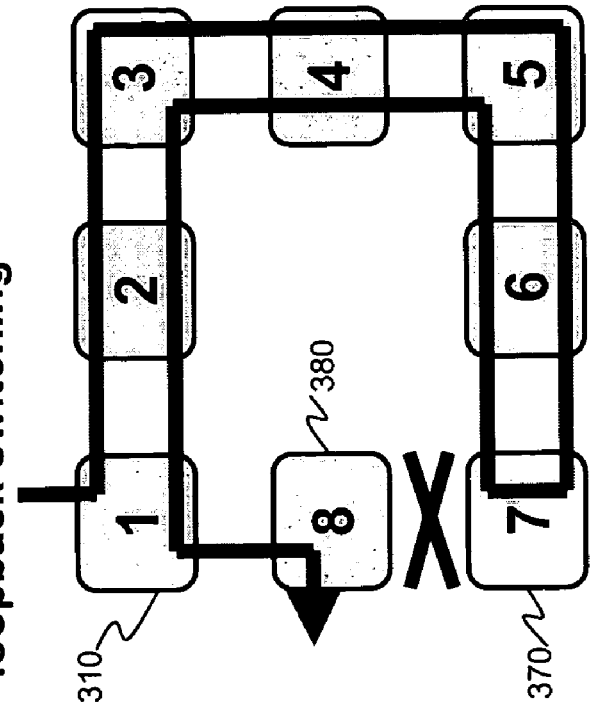
FIG. 3A depicts a conventional architectural diagram illustrating an eight node ring that shows the longest path for protected channel using loopback switching.
Figure 6B:
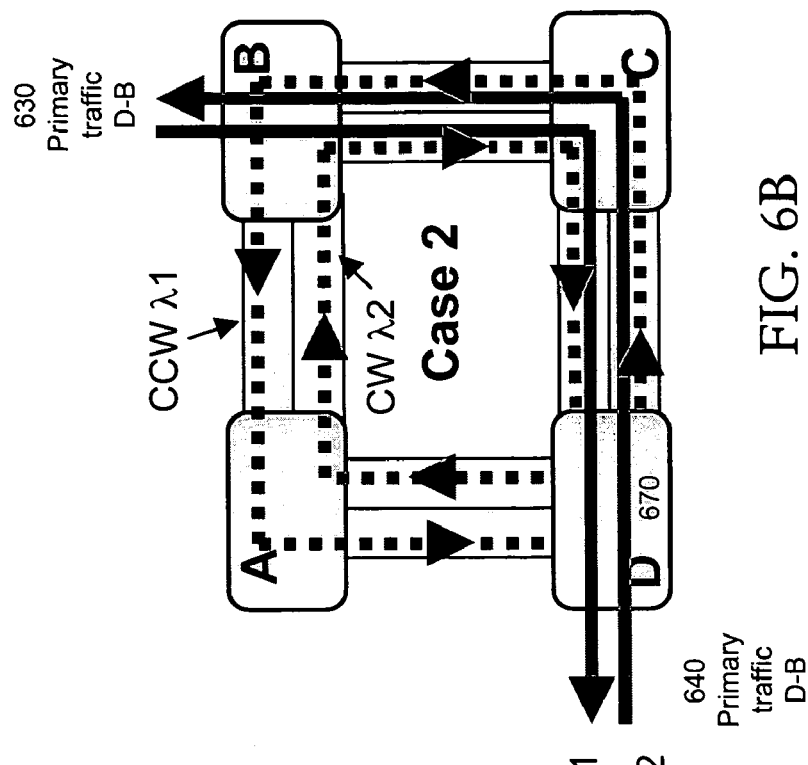
FIGS. 6A-6B depict architectural diagrams illustrating an example of OMS shared protection switching with loopback switching that have, unterminated and terminated protection channels, respectively, that are unlit in accordance with the present invention.
Figure 6A:
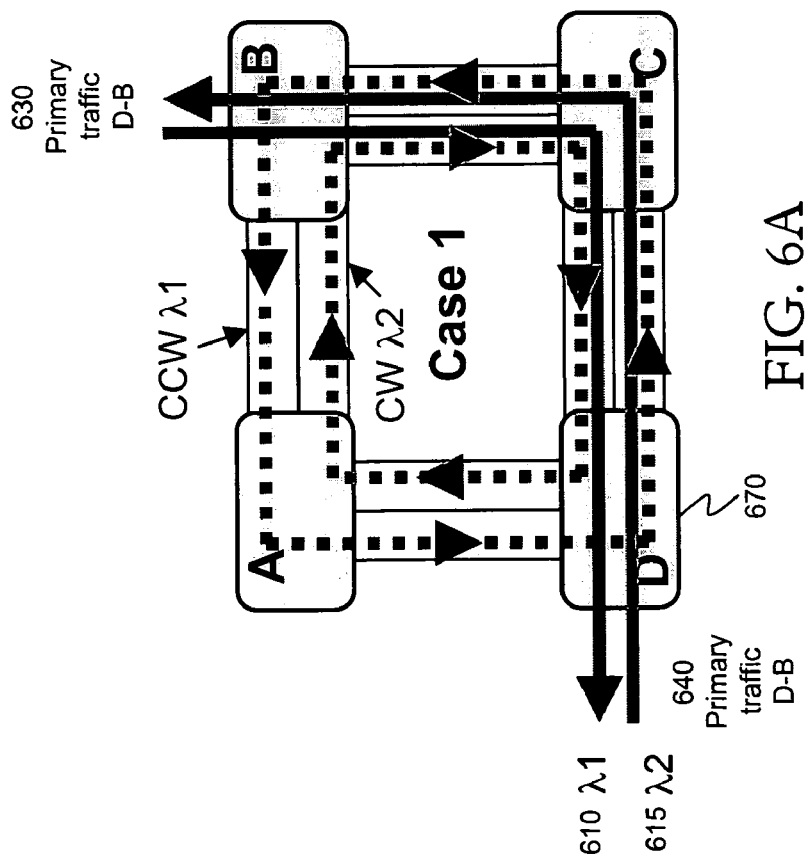

FIGS. 6A-6B depict an architectural diagram illustrating an example of OMS shared protection switching with loopback switching that have unterminated and terminated protection channels that are unlit in accordance with the present invention. This example shows why wavelength blockers change state to support OMS shared protection with loopback switching. Consider primary channels λ1 and λ2 being transported on a four node ring as shown in FIGS. 2A and 2B.

Under normal conditions, a primary traffic 630 on λ1 610 travels clockwise around the ring in FIG. 6A. There is protection capacity on λ1 620 traveling counter-clockwise around the ring in FIG. 6B. If no extra traffic is present, then the protection capacity (counterclockwise channel λ1 620 and clockwise channel λ2 625) remains unlit. The unlit protection channels may present an issue for proper ring operation. FIGS. 6A and 6B present two cases.

In Case 1 as shown in FIG. 6A, the unlit protection channels are configured as through channels within all the nodes. These unlit channels go around and around, allowing amplified spontaneous emission (ASE) noise buildup (delivered from the EDFAs into the passbands of the unlit channels). The uncontrolled noise buildup can in turn lead to power fluctuations among the lit channels, which is unacceptable. The solution to this condition is for at least one node on the ring to block passage of unlit channels. This is shown as Case 2 in FIG. 6B. A Node D 670 is shown to block unlit protection channel λ1 620 traveling counterclockwise around the ring, and unlit protection channel λ2 625 traveling clockwise.

Therefore, the node D 670 performs the following functions:

Drop primary channel λ1 from the east incoming fiber;

Add primary channel λ2 to the east outgoing fiber;

Block unlit protection channel λ1 from the west incoming fiber; and

Block unlit protection channel λ2 from the east incoming fiber.

Figure 7:
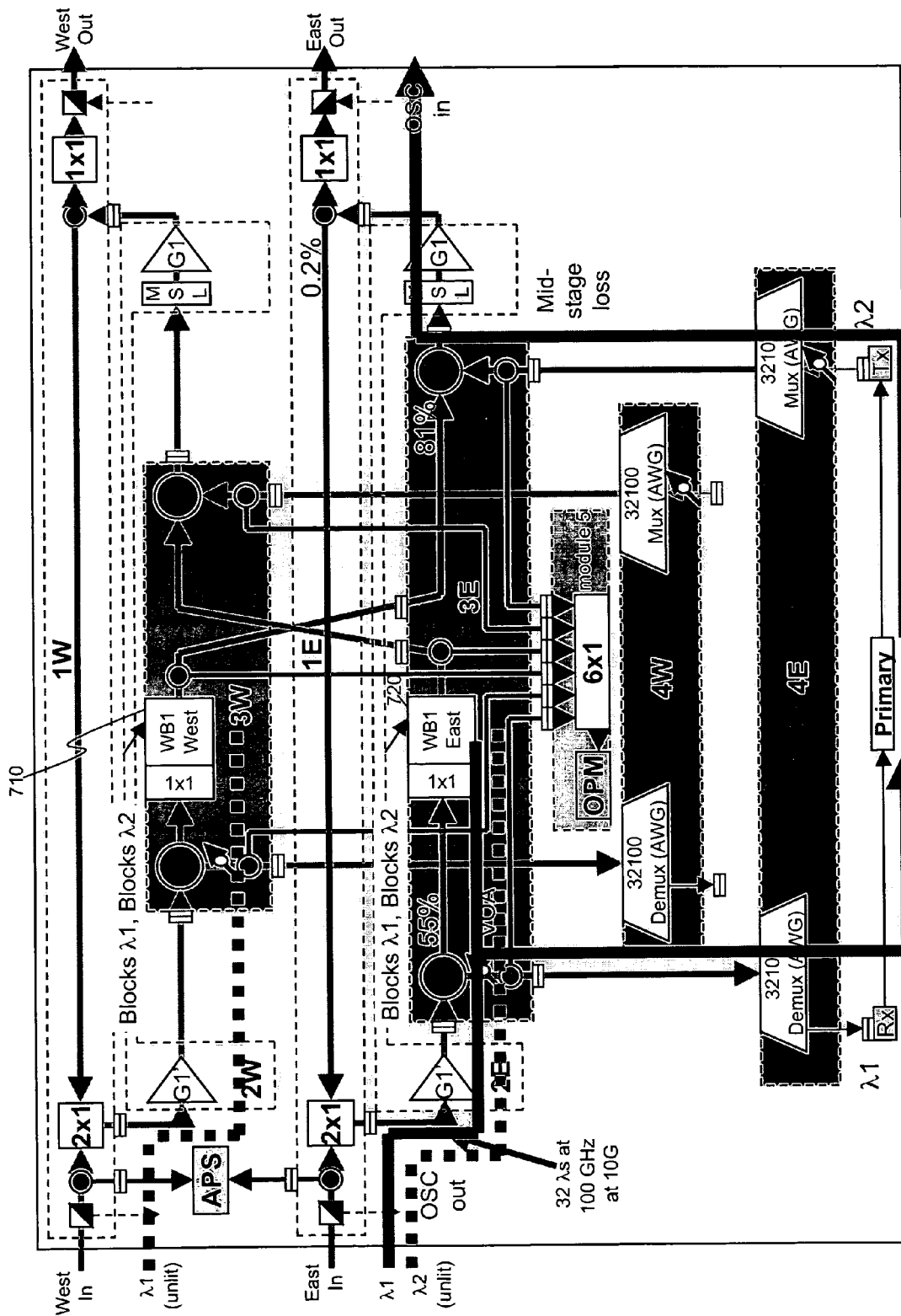
FIG. 7 depicts an architectural diagram illustrating the example described with respect to FIGS. 6A-6B with OMS shared protection switching with loopback switching on signals flowing through Node D under normal conditions in accordance with the present invention.

FIG. 7 depicts an architectural diagram illustrating the example described with respect to FIGS. 6A-6B with OMS shared protection switching with loopback switching on signals flowing through Node D under normal conditions in accordance with the present invention. The wavelength blockers WB1 West 710 and WB1 East 720 are configured to block both channels λ1 and λ2. Under failure conditions, Node D still maintains its add and drop of the primary channels. Node D additionally connects the now lit protection channels as through signals. Therefore, the Node D 670 performs the following functions:

Drop primary channel λ1 from the east incoming fiber;

Add primary channel λ2 to the east outgoing fiber;

Connect lit protection channel λ1 from the west incoming fiber to the east outgoing fiber;

Connect lit protection channel λ2 from the east incoming fiber to the west outgoing fiber.

Figure 8:
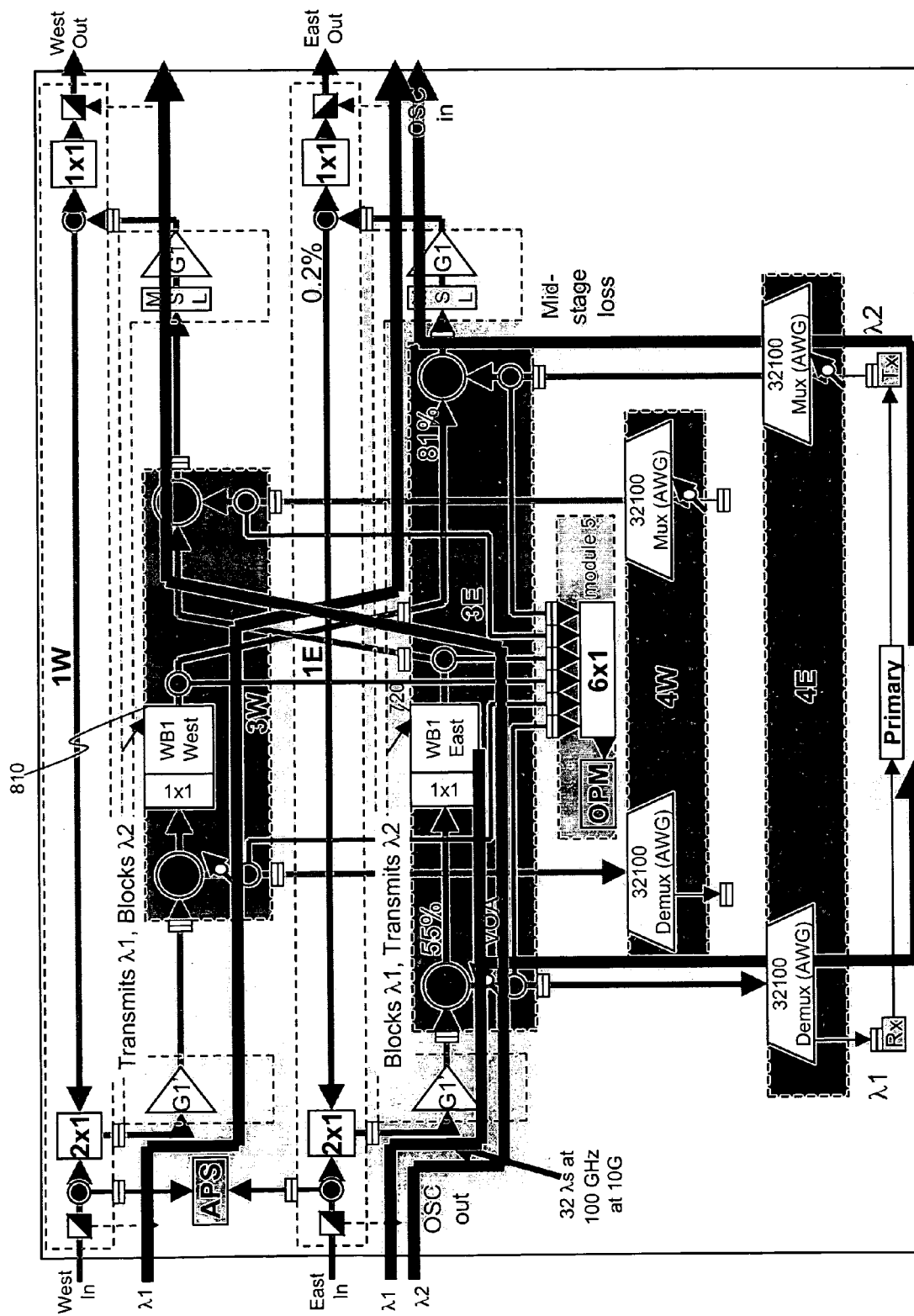
FIG. 8 depicts an architectural diagram illustrating the example described with respect to FIGS. 6A-6B with OMS shared protection switching with loopback switching on signals flowing through Node D under a failure condition (cable cut between nodes B and C) in accordance with the present invention.

FIG. 8 depicts an architectural diagram illustrating the example described with respect to FIGS. 6A-6B with OMS shared protection switching with loopback switching on signals flowing through Node D under a failure condition (cable break between nodes B and C, as shown in FIG. 2B) in accordance with the present invention. It is noted that the general architecture of FIG. 2B is also applicable to the present invention. The wavelength blockers WB1 West 810 and WB1 East 820 are obliged to change state in order to implement the ring switching. Specifically, WB1 West 810 changes from blocking to transmitting protection channel λ1, and WB1 East 820 changes from blocking to transmitting protection channel λ2. This means that the wavelength blocker transition times contribute to the overall ring switching time. If SONET-like ring switching times of 50 ms are to be met, an allocation of that switching time to wavelength blockers is not likely to exceed 5 to 10 ms.

To illustrate why this implementation of OMS shared protection is called loopback switching, consider Node B adjacent to the failure in FIG. 2B. In addition to terminating the primary traffic, Node B could be configured to either block or transmit unlit protection channels. It is unnecessary for Node B to block unlit protection channels if Node D is already doing it. Further, if Node B needs later to transmit the protection channels, then Node B blocker transitions would also add to the ring switching time. Node B is therefore configured to transmit the two unlit protection channels under consideration. To summarize, Node B needs to:

Drop primary channel λ2 from the west incoming fiber;

Add primary channel λ1 to the west outgoing fiber;

Connect unlit protection channel λ1 from the west incoming fiber to the east outgoing fiber;

Connect unlit protection channel λ2 from the east incoming fiber to the west outgoing fiber.

Figure 9:
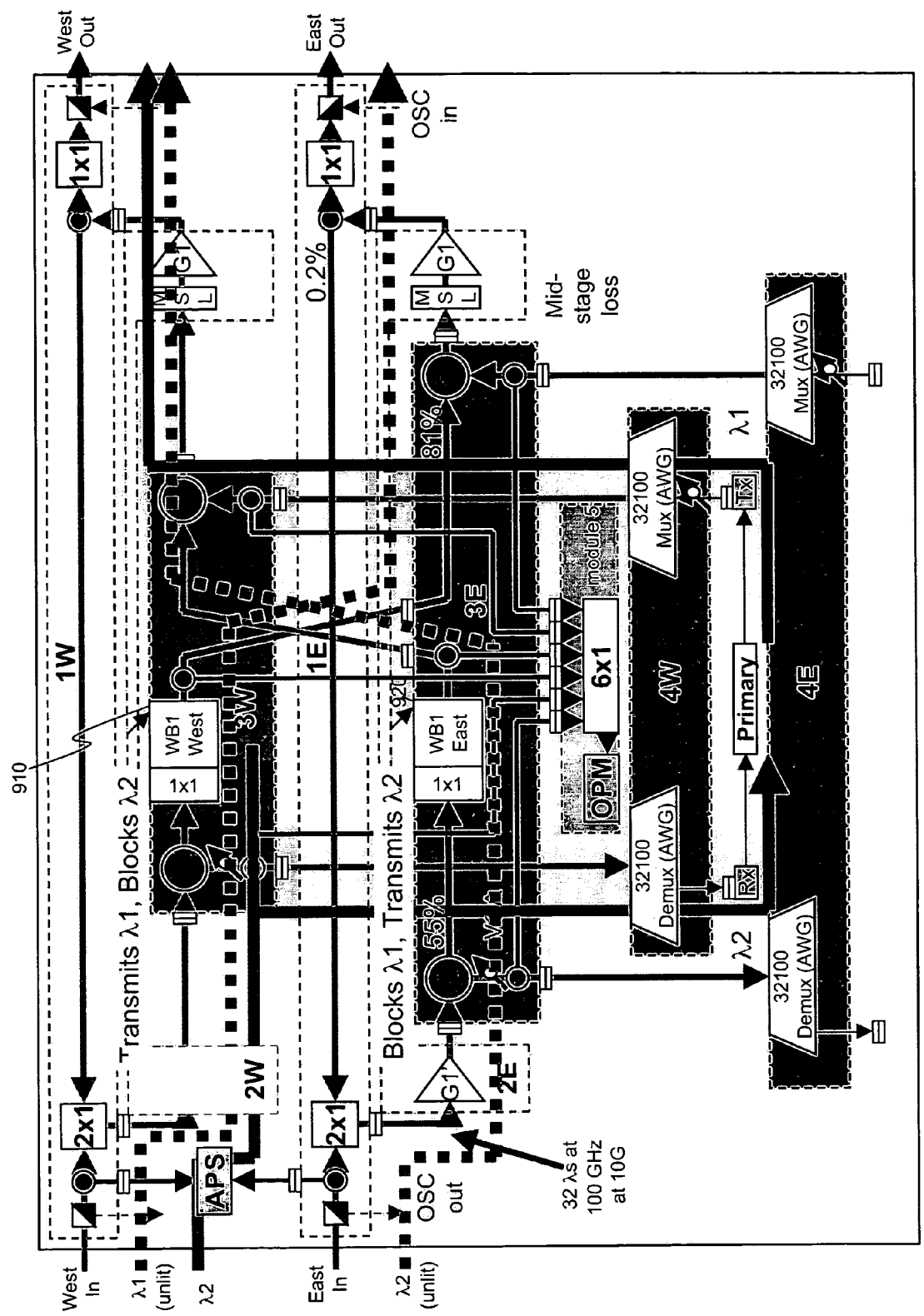
FIG. 9 depicts an architectural diagram illustrating the example described with respect to FIGS. 6A-6B with OMS shared protection switching with loopback switching on signals flowing through Node B under normal conditions in accordance with the present invention.

FIG. 9 depicts an architectural diagram illustrating the example in FIGS. 6A-6B with OMS shared protection switching with loopback switching on signals flowing through Node B under normal conditions in accordance with the present invention. Wavelength blocker WB1 West 910 is configured to transmit unlit protection channel λ1 and block working channel λ2. Wavelength blocker WB1 East 920 is configured to block unlit working channel λ1 and transmit protection channel λ2.

Under failure conditions, Node B now needs to bridge its outgoing signals from the west outgoing fiber and create a loopback to the west incoming signal. As shown in FIGS. 2A and 2B, Node B needs to:

Loopback channel λ2 from the west outgoing fiber to become a west incoming signal, then drop the channel; and Bridge and loopback the add channel λ1 from the west outgoing fiber to become a west incoming signal. This copy then is connected to become an east outgoing signal.

Figure 10:
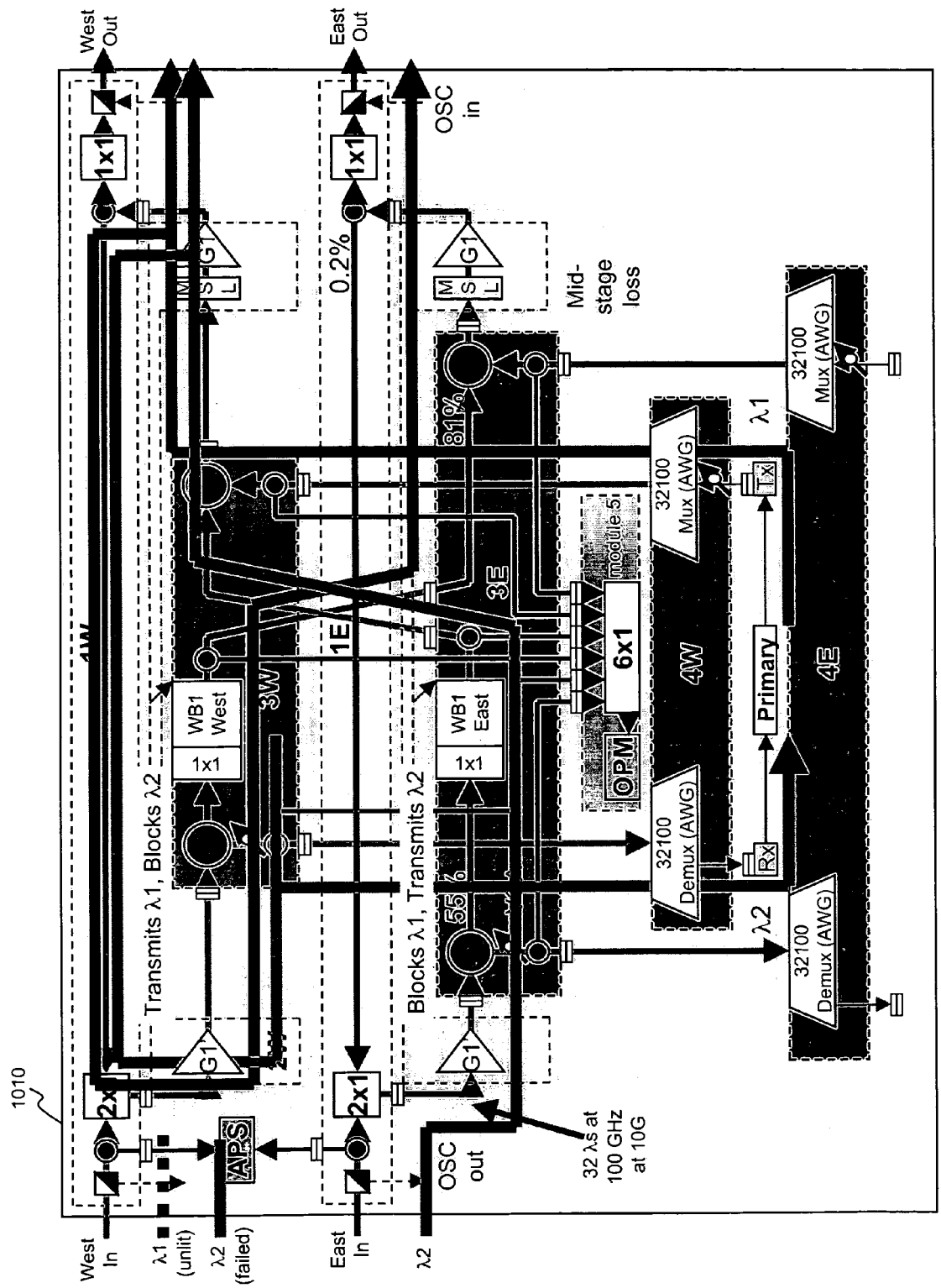
FIG. 10 depicts an architectural diagram illustrating the example described with respect to FIGS. 6A-6B with OMS shared protection switching with loopback switching on signals flowing through Node B under a failure condition (cable cut between nodes B and C) in accordance with the present invention.

FIG. 10 depicts an architectural diagram illustrating the example described with respect to FIGS. 6A-6B with OMS shared protection switching with loopback switching on signals flowing through Node B under a failure condition (cable break between Nodes B and C) in accordance with the present invention. The wavelength blockers in Node B do not need to change state. However, the 2×1 switch 1010 on the west incoming signal does need to switch quickly (e.g. within 5 ms to 10 ms).

Figure 11:
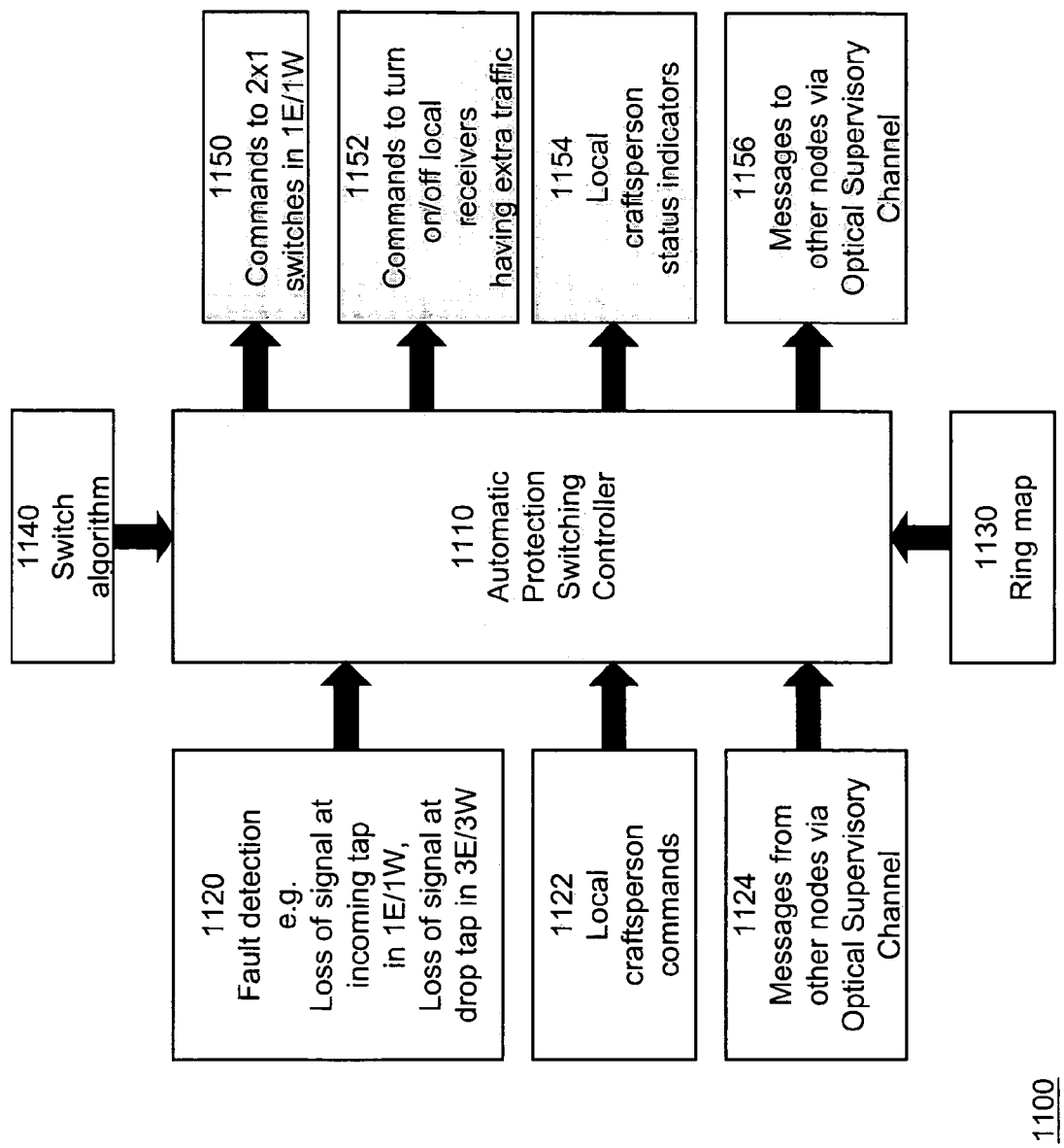
FIG. 11 depicts a flow diagram illustrating the command, control, and status information that flows into and out of the automatic protection switching controller. The APS controller resembles a state machine that uses an algorithm to determine its outputs based on the information presented to the inputs.

The ROADMs shown in FIGS. 4 and 5 require not only hardware to implement OMS shared protection, but control signals and algorithms in order to know when to initiate and remove loopback switches. FIG. 11 illustrates a flow diagram 1100 the possible inputs and outputs necessary for an APS controller 1110 to go about in implementing the algorithm for OMS shared protection. Triggers for protection switching are gathered from three separate sources, namely (1) locally detected signal faults 1120, (2) manual commands initiated by a craftsperson 1122, or (3) bridge requests coming from other nodes 1124. As part of the initialization routine of the APS controller 1110, it will also need to be given the naming order of the nodes present on the ring 1130, and a ring control algorithm 1140. Those skilled in the art could derive rules-based algorithms based on those standardized for single channel SONET and SDH shared protection rings. Based on these inputs, the APS controller 1110 has a number of outputs. The APS controller 1110 sends out switching commands 1130 to the 2×1 switches within the optical supervisory channels. The APS controller 1110 sends out commands 1150 to deactivate or reactive optical receivers locally configured to receive extra traffic. Extra traffic 1152 is carried on Optical Channels that use spare protection wavelengths under normal conditions, but are pre-empted during failure conditions. During failure conditions, OMS signals that are looped back within the ROADMs of FIGS. 4 and 5 present drop signals (via the broadcast portion of the broadcast and select module) that are not meant for the local extra traffic receivers. To avoid misconnecting these signals, the extra traffic receivers need to deactivate themselves. The status 1154 of the switching condition of the ROADM may be needed by a craftsperson, so the APS controller may send such an indication. Finally, for proper ring operation, the node needs to send messages 1156 to other nodes on the ring.

Figure 12:
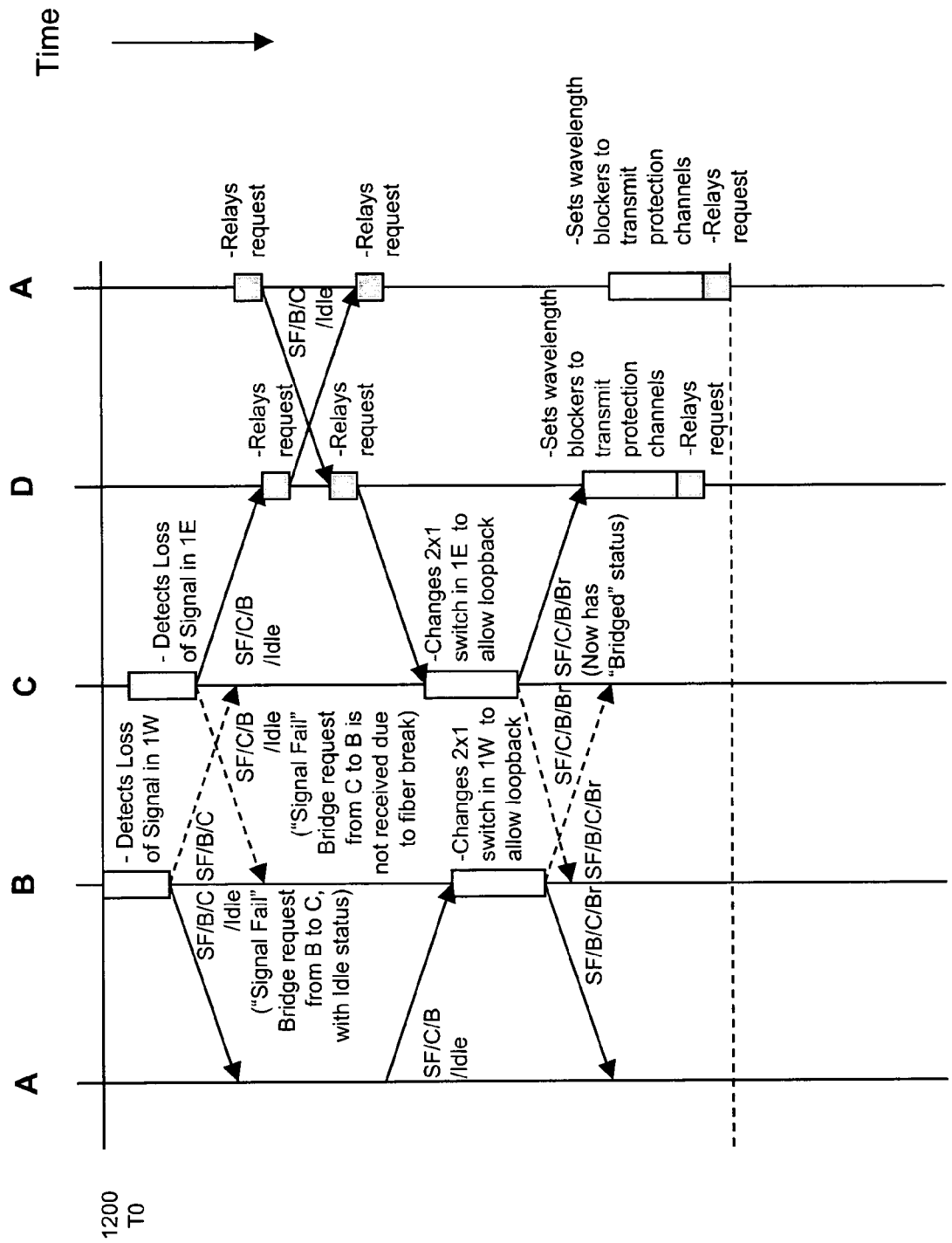
FIGS. 12 through 15 illustrate an example of the actions of a four node OMS shared protection both during a cable break failure (as illustrated in FIG. 2B) and its subsequent repair.
Figure 13:
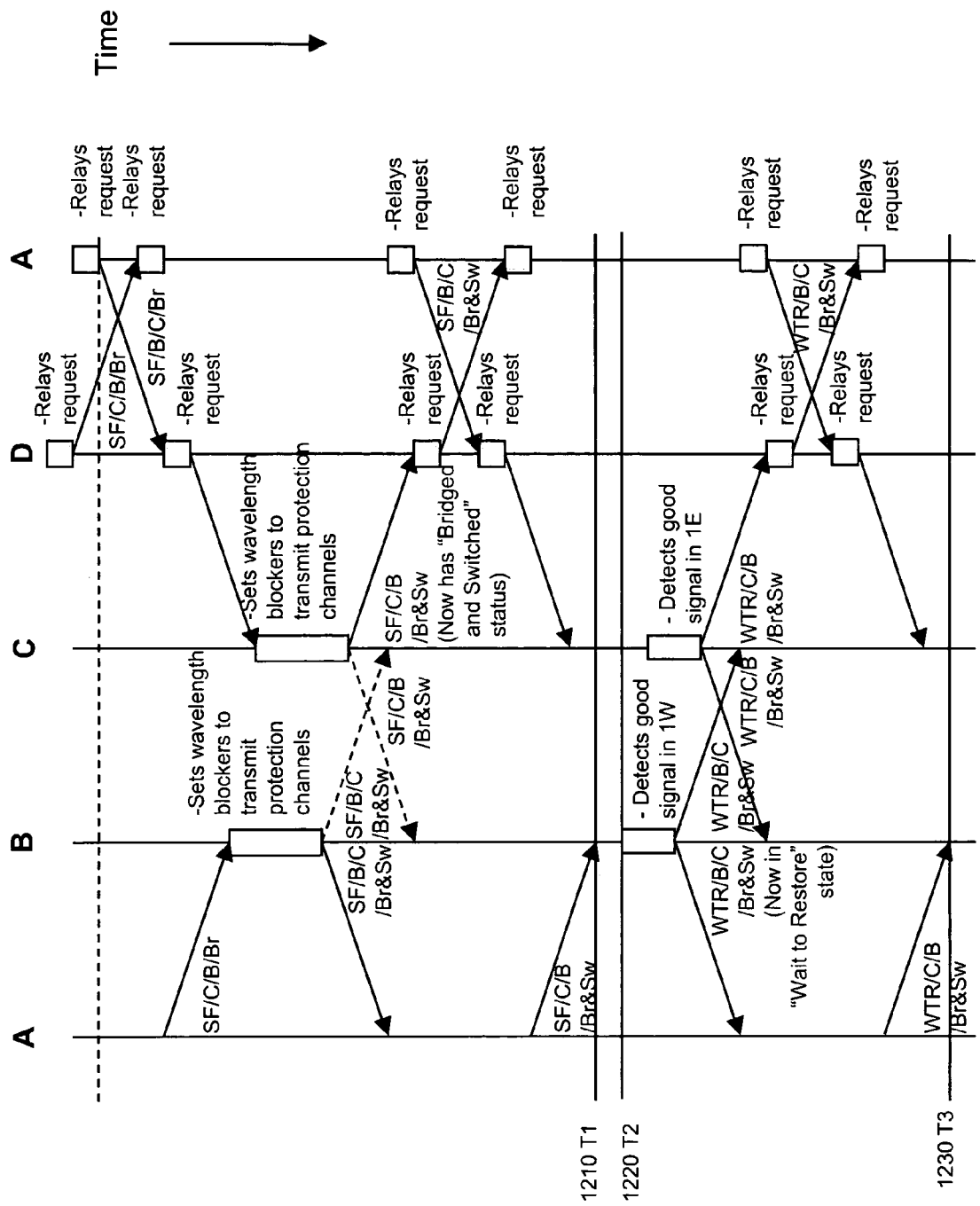

FIGS. 12 through 15 illustrate an example of the actions of a four node OMS shared protection both during a cable break failure (as illustrated in FIG. 2B) and its subsequent repair. In this example, no extra traffic is presumed to be present on the ring. It is also presumed that all nodes are initially configured to block unlit and unused protection wavelengths during normal conditions. At time T0 1200, a cable breaks between Nodes B and C. As shown in FIG. 12, both Nodes B and C detect incoming OMS signal failures, though at different times. Each node needs to send a set of messages to the other in order to correctly co-ordinate the protection switching and avoid misconnected traffic. Node B sends a "Signal Fail" bridge request from itself addressed to Node C, along with an "Idle" status indication that it has not started any loopback bridges or switches. Messages are sent both on the "short path" fiber direction towards the failure, and on the "long path" direction away from the failure. (For simplicity, short and long path designations are not shown in FIGS. 12-15.) Similarly, Node C sends a "Signal Fail" bridge request from Node C to Node B on both long and short paths. Nodes A and D, which are not adjacent to the failure, relay the long path messages between Nodes B and C. Upon receiving long path bridge requests, adjacent Nodes B and C each change one of their 2×1 switches to initiate an OMS loopback signal. Nodes B and D each send new APS messages indicating their "bridged" status to each other. When the non-adjacent nodes first see an APS message indicating a "bridged" status by either of the adjacent nodes, the non-adjacent nodes change their wavelength blocker states to allow bidirectional pass-through of the protection wavelengths. The non-adjacent nodes then relay the APS messages. Upon receiving a long-path message from Node C confirming its "bridged" status, Node B configures its wavelength blockers to also allow bidirectional pass-through of its protection wavelengths. This is shown in FIG. 13. Node B then sends a new message indicating its "bridged and switched" status. Node C does similar actions, and Nodes A and D relay these messages. Self-healing is now complete, and ring signaling reaches steady state at time T1 1210.

Figure 14:
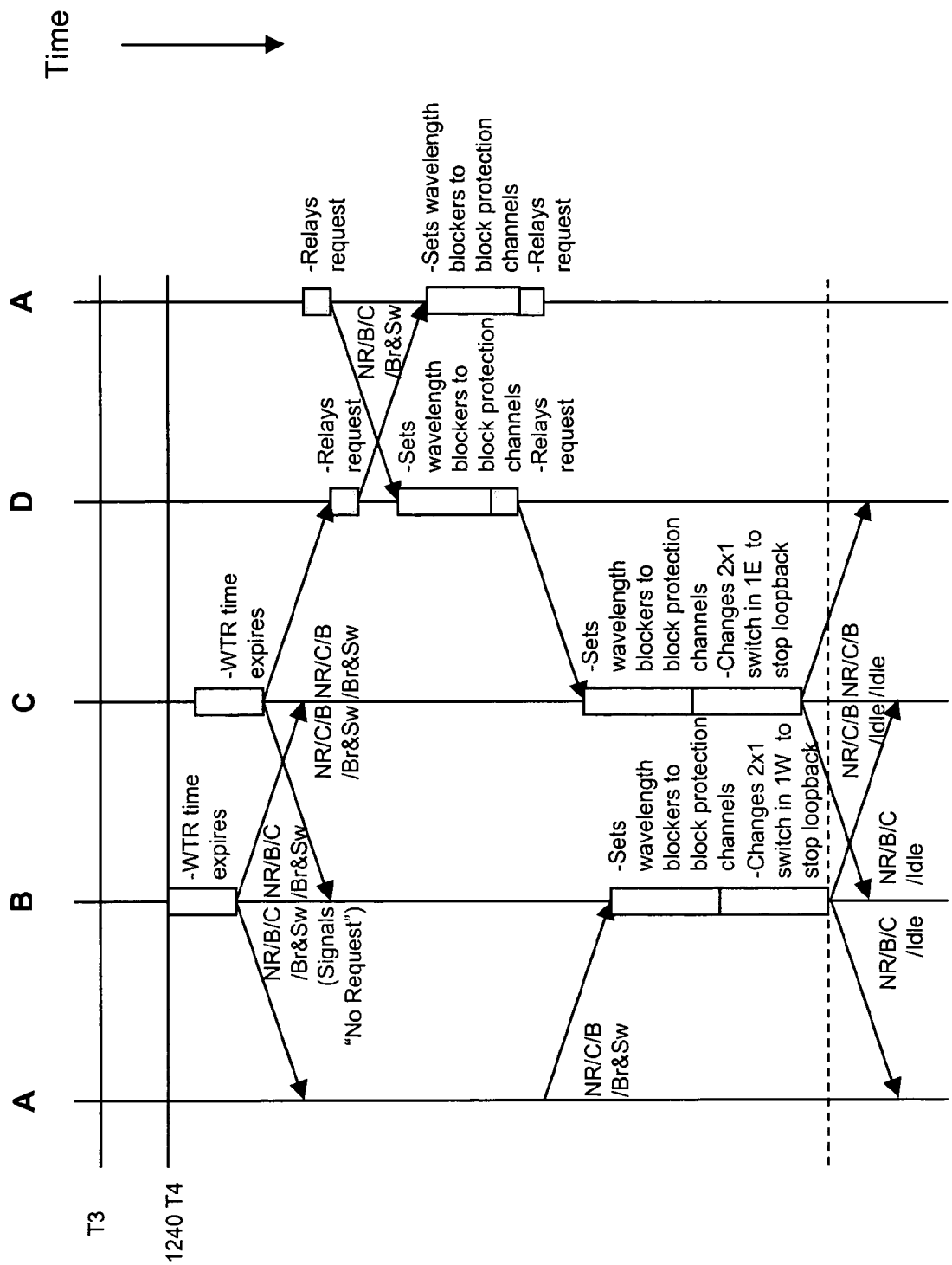
Figure 15:
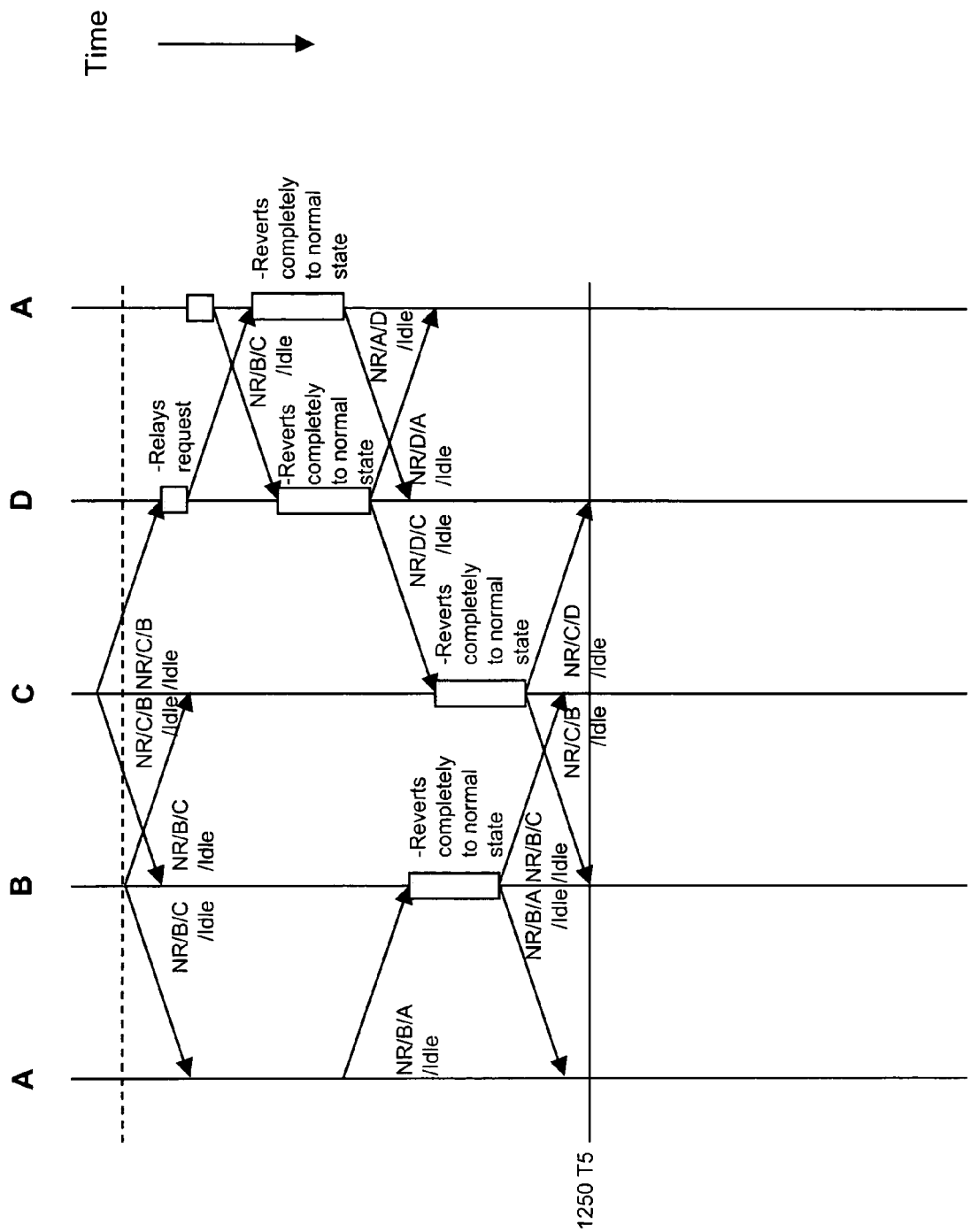

At some point, the two fibers within the cable between Nodes B and C are repaired, and a good OMS signal is first detected by Node B at time T2 1220. Rather then initiating an immediate dismantling of the ring protection switch, Node B enters a "wait-to-restore" time period to confirm that the newly detected signal will indeed last. Node B replaces its "Signal Fail" bridge request with a "Wait-To-Restore" bridge request on both short and long paths. The long path signal is relayed around the ring. Node C eventually also sees a good (repaired) signal as well, and acts in the same manner as Node B. Signaling again reaches steady-state at time T3 1230. At time T4 1240, as shown in FIG. 14, the wait-to-restore soaking time for Node B expires. To return to normal conditions, Node B sends a "No Request" bridge request to Node C on both short and long paths. It does not yet change any switches. The long path message is relayed around the ring. When the wait-to-restore time for Node C expires, Node C sends a similar "No Request" bridge request to Node B. When non-adjacent Nodes A and D see "No Request" bridge requests coming from both east and west directions, Nodes A and D reconfigure their wavelength blockers to once again block protection wavelengths traveling in both directions. Node B sees the "No Request" bridge request from Node C on the long path, then (1) also reconfigures its wavelength blockers to block protection wavelengths, (2) resets its 2×1 switch in module 1W to once again receive the incoming West In signal, and (3) signals its "Idle" status to the other nodes. Upon seeing the "No Request" bridge request from Node B on the long path, Node C takes similar actions. Finally, FIG. 15 shows that as each node sees "No Request" bridge requests combined with "Idle" status indications coming from both sides, each node returns to its normal state. Each node signals a "No Request" bridge request from itself to its nearest neighbor, with an "Idle" status. Signaling reaches steady-state at time T5 1250, and the ring reverts to normal conditions.

Those skilled in the art can now appreciate from the foregoing description that the broad techniques of the embodiments of the present invention can be implemented in a variety of forms. For example, the 2.5% optical tap 466 and the 2.5% optical tap 476 can be implemented with other type of optical taps without departing from the spirits of the present invention. Furthermore, the reconfigurable optical add-drop multiplexers in the present invention are applicable in metropolitan and regional applications, as well as local networks, long-haul networks and ultra-long-haul networks. Therefore, while the embodiments of this invention have been described in connection with particular examples thereof, the true scope of the embodiments of the invention should not be so limited since other modifications, whether explicitly provided for by the specification or implied by the specification, will become apparent to the skilled practitioner upon a study of the drawings, specification, and following claims.

I claim:

1. A reconfigurable optical add-drop multiplexer (ROADM) supporting Optical Multiplex Section shared protection with loopback switching, comprising:
    a first optical supervisory module, comprising:
        a WestIn port for receiving a multichannel signal comprising a first set of Optical Channels;
        a 2×1 switch having a first input, a second input, and an output, the first input for receiving a WestIn optical signal, a second input for receiving a small fraction of a loopback copy of an outgoing Optical Multiplex Section, the loopback copy comprising the multichannel signal having the first set of Optical Channels, the 2×1 switch selecting either the first input or the second input for generating to the output of the 2×1 switch;
        an optical tap having an input, a first output, and a second output, the optical tap tapping a portion of the multichannel signal that is used to determine the presence or absence of an incoming signal to the first output, the first output of the optical tap coupled to the second input of the 2×1 switch;
        an 1×1 switch having an input coupled to the output of the second output of the optical tap and output;
        a WestOut port coupled to the output of the 1×1 switch:
    an amplifier module having an input coupled to the output of the 2×1 module, and an output; and
    a broadcast and select module having a first input coupled to the output of the amplifier module, a second input, and an output coupled to the input of the optical tap.

2. The ROADM of claim 1, further comprising a second optical supervisory module, comprising:
    an EastIn port for receiving a multichannel signal comprising a first set of Optical Channels;
    a 2×1 switch having a first input, a second input, and an output, the first input for receiving an EastIn optical signal, a second input for receiving a small fraction of a loopback copy of an outgoing Optical Multiplex Section, the loopback copy comprising the multichannel signal having the first set of Optical Channels, the 2×1 switch selecting either the first input or the second input for generating to the output of the 2×1 switch;

an optical tap having an input, a first output, and a second output, the optical tap tapping a portion of the multichannel signal that is used to determine the presence or absence of an incoming signal to the first output, the first output of the optical tap coupled to the second input of the 2×1 switch;

an 1×1 switch having an input coupled to the output of the second output of the optical tap and output;

an EastOut port coupled to the output of the 1×1 switch;

an amplifier module having an input coupled to the output of the 2×1 module, and an output; and a broadcast and select module having a first input coupled to the output of the amplifier module, a second input, and an output coupled to the input of the optical tap.

3. The ROADM of claim 2, further comprising a multiplexer/demultiplexer module coupled to the broadcast and select module (440).

4. The ROADM of claim 3, further comprising a multiplexer/demultiplexer module coupled to the broadcast and select module.

5. A reconfigurable optical add-drop multiplexer supporting Optical Multiplex Section shared protection with loopback switching, comprising:

a first optical supervisory module, comprising:

a WestIn port for receiving a multichannel signal comprising a first set of Optical Channels;

a 2×1 switch having a first input, a second input, and an output, the first input for receiving a WestIn optical signal, a second input for receiving a small fraction of a loopback copy of an outgoing Optical Multiplex Section, the loopback copy comprising the multichannel signal having the first set of Optical Channels, the 2×1 switch selecting either the first input or the second input for generating to the output of the 2×1 switch;

an optical tap having an input, a first output, and a second output, the optical tap tapping a portion of the multichannel signal that is used to determine the presence or absence of an incoming signal to the first output, the first output of the optical tap coupled to the second input of the 2×1 switch;

an 1×1 switch having an input coupled to the output of the second output of the optical tap and output;

a WestOut port coupled to the output of the 1×1 switch;

a pre-amplifier having an input coupled to the output of the 2×1 module, and an output;

a broadcast and select module having a first input coupled to the output of the amplifier module, a second input, and an output coupled to the input of the optical tap; and a booster amplifier having an input coupled to the broadcast and select module and an output coupled to the optical tap.

6. The ROADM of claim 5, further comprising a second optical supervisory module, comprising:

an EastIn port for receiving a multichannel signal comprising a first set of Optical Channels;

a 2×1 switch having a first input, a second input, and an output, the first input for receiving an EastIn optical signal, a second input for receiving a small fraction of a loopback copy of an outgoing Optical Multiplex Section, the loopback copy comprising the multichannel signal having the first set of Optical Channels, the 2×1 switch selecting either the first input or the second input for generating to the output of the 2×1 switch;

an optical tap having an input, a first output, and a second output, the optical tap tapping a portion of the multichannel signal that is used to determine the presence or absence of an incoming signal to the first output, the first output of the optical tap coupled to the second input of the 2×1 switch;

an 1×1 switch having an input coupled to the output of the second output of the optical tap and output;

an EastOut port coupled to the output of the 1×1 switch;

a pre-amplifier having an input coupled to the output of the 2×1 module, and an output;

a broadcast and select module having a first input coupled to the output of the amplifier module, a second input, and an output coupled to the input of the optical tap; and a booster amplifier having an input coupled to the broadcast and select module and an output coupled to the optical tab.

7. The ROADM of claim 5, further comprising a midstage loss coupled between the broadcast and select module and the booster amplifier.

8. The ROADM of claim 5, further comprising a midstage loss coupled between the broadcast and select module and the booster amplifier.

9. The ROADM of claim 5, further comprising a multiplexer/demultiplexer module coupled to the broadcast and select module.

10. The ROADM of claim 5, further comprising a multiplexer/demultiplexer module coupled to the broadcast and select module.

11. A reconfigurable optical add-drop multiplexer (ROADM), comprising:

a first optical supervisory module, comprising:

an input port Ain for receiving a multichannel signal comprising a first set of Optical Channels;

a first 2×1 switch having a first input, a second input, and an output, the first input for receiving an input port A optical signal, a second input for receiving a small fraction of a loopback copy of an outgoing Optical Multiplex Section, the loopback copy comprising the multichannel signal having the first set of Optical Channels, the first 2×1 switch selecting either the first input or the second input for generating to the output of the first 2×1 switch;

a first optical tap having an input, a first output, and a second output, the optical tap tapping a portion of the multichannel signal that is used to determine the presence or absence of an incoming signal to the first output, the first output of the optical tap coupled to the second input of the first 2×1 switch;

a first 1×1 switch having an input coupled to the output of the second output of the optical tap and output;

an output port Aout coupled to the output of the first 1×1 switch;

an amplifier means having an input coupled to the output of the 2×1 module, and an output; and a broadcast and select module having a first input coupled to the output of the amplifier means, a second input, and an output coupled to the input of the optical tap.

12. The ROADM of claim 11, wherein the first optical supervisory module comprises a West optical supervisory module.

13. The ROADM of claim 11, wherein the first optical supervisory module comprises an East optical supervisory module.

* * * * *